Patented Apr. 27, 1943

2,317,726

UNITED STATES PATENT OFFICE 2,317,726

BREAKING AGENT FOR EMULSIONS FROM CRUDE PETROLEUM AND SALT WATER AND A BREAKAGE OF SAID EMULSIONS

Karl Boedeker and Karl Winnacker, Frankfort-on-the-Main-Hochst, Germany; vested in the Alien Property Custodian No Drawing. Application November 22, 1938, Serial No. 241,868. In Germany November 23, 1937

1 Claim. (Cl. 252—331)

The present invention relates to a breaking agent for emulsions from crude petroleum and salt water and to a breakage of said emulsions.

In the co-pending U. S. application Serial No. 212,331 filed June 7, 1938, in the name of August Moeller, for "Cleaving agent for emulsions" there is described a process of breaking natural emulsions of crude oil containing water or aqueous salt solutions which consists in adding to the emulsions small portions of the products of the action of ethylene oxide on aliphatic or aromatic compounds having at least one hydroxyl group, carbonyl group or amino group, and carrying a chain of at least 6 alkylene oxide groups bound in an ether-like manner. By the addition of these products the separation of the emulsion into the oil phase and the water phase is promoted.

Now we have found that the breakage of some emulsions may be considerably improved and accelerated by using as breaking agent for the process described in the above named co-pending application a substance of the kind described therein the aqueous solution of which decomposes into two phases above a certain temperature and by breaking the emulsion above that temperature. As bodies of this kind there may be named the substances having one or several carboxyl groups, hydroxyyl groups or amino groups, obtainable as for instance described in French Patent No. 727,202 and in British Patent No. 470,181 by a chain addition of ethylene oxide to an aliphatic, aromatic, an aliphatic-aromatic or a cyclo-aliphatic compound.

The following example serves to illustrate the invention, but it is not intended to limit it thereto; the parts are by weight:

0.5 part of a mixture of isomeric dodecyl- to tetradecyl-phenyl-polyglycolic ethers, the polyglycolic radical of which comprises about 13 to 15 mol of etheylene oxide, is added to 750 parts of a crude petroleum emulsified with 250 parts of a sodium chloride solution of about 20 per cent strength. The aqueous solution of these polyglycolic ethers quantitatively separates at above 43° C. into two phases. At a temperature of 55° C. the above named emulsion has completely broken within one hour.

We claim:

In the breaking of emulsions from crude petroleum and salt water the step which comprises adding at a temperature above 55° C. to the emulsions a small quantity of a mixture of isomeric dodecyl- to tetradecyl-phenyl-polyglycolic ethers, the polyglycolic radical of which comprises about 13 to 15 mol of etheylene oxide in an etherlike chain, the aqueous solution of which mixture decomposes into two phases at a temperature about 43° C.

KARL BOEDEKER.
KARL WINNACKER.